UNITED STATES PATENT OFFICE.

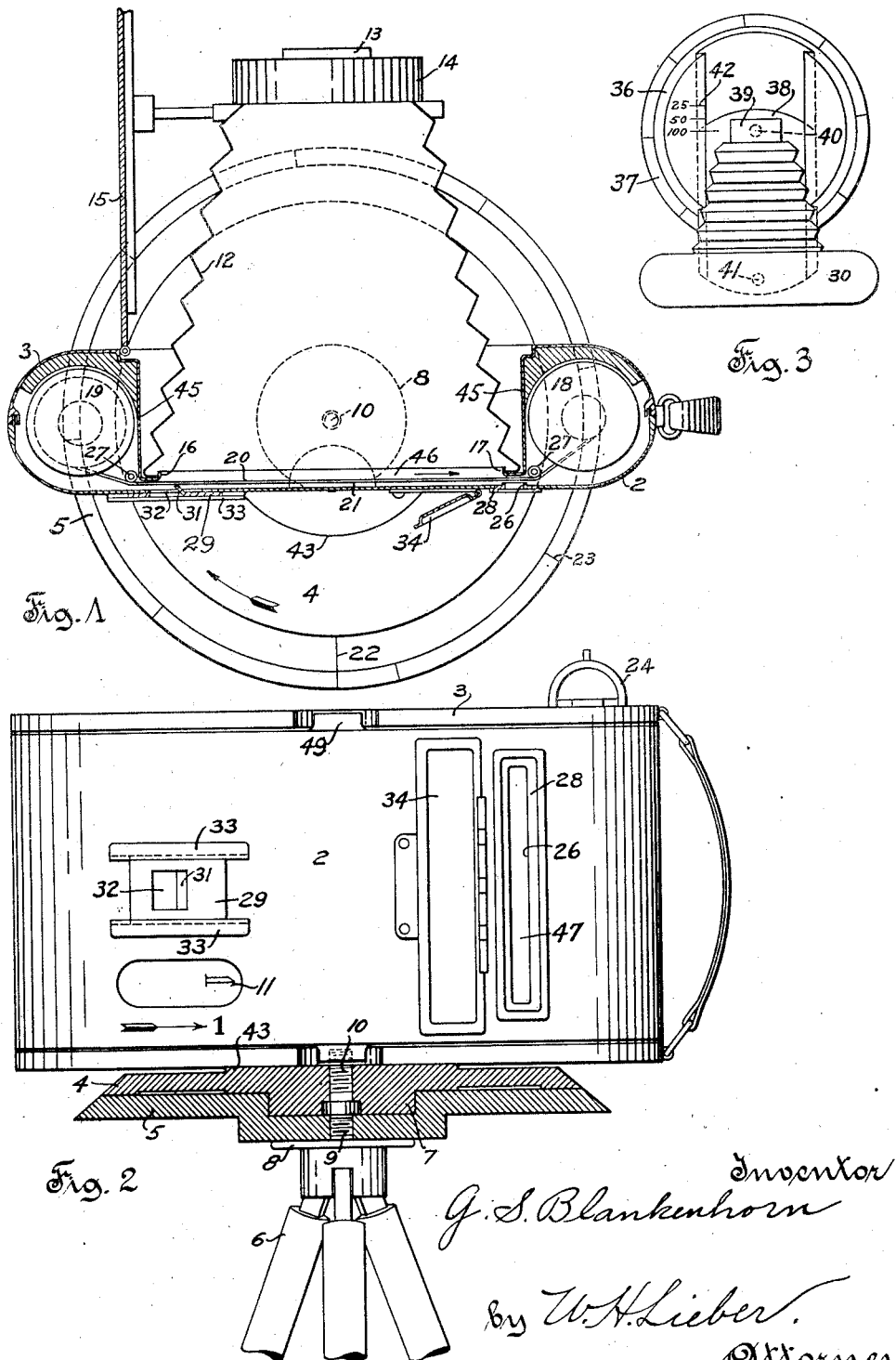

GEORGE STEVENS BLANKENHORN, OF MILWAUKEE, WISCONSIN.

METHOD OF AND APPARATUS FOR MAKING PANORAMIC PICTURES.

1,282,177.  Specification of Letters Patent.  Patented Oct. 22, 1918.

Application filed November 6, 1916. Serial No. 129,695.

*To all whom it may concern:*

Be it known that I, GEORGE STEVENS BLANKENHORN, a citizen of the United States, residing at Milwaukee, in the county of Milwaukee and State of Wisconsin, have invented certain new and useful Improvements in Methods of and Apparatus for Making Panoramic Pictures, of which the following is a specification.

This invention relates to improvements in methods of and apparatus for producing a continuous series of photographic records on a sensitized body, and relates more specifically to a method of utilizing roll-film cameras of the types ordinarily used by amateur photographers, for producing panoramic pictures.

An object of the invention is to provide a simple and efficient method of producing a continuous series of photographic records on a sensitized body. Another object is to provide simple, efficient and inexpensive apparatus for carrying on this method. A further object is to provide means whereby a roll-film camera of any of the standard types ordinarily used by amateur photographers, may be utilized to produce panoramic pictures. Still another object is to provide a compact and inexpensive attachment for producing panoramic pictures with a roll-film camera of the type ordinarily used by amateur photographers, which requires no extraordinary skill in its manipulation in order to produce commercial results.

It has heretofore been proposed to produce panoramic pictures with the aid of special mechanism adapted to rotate the camera about an axis and to simultaneously expose successive sections of the film during rotation of the camera. It has also been proposed to produce panoramic pictures by making a succession of records on a film while the film and camera were stationary, the adjacent records overlapping and the overlapped sections being blended in order to make the series of records continuous. The former of these methods is objectionable since it requires the use of special mechanism of cumbersome construction and too expensive for amateur use. The latter method is objectionable since it is difficult to secure a continuous picture in which the details of the picture at the overlapped sections, are distinct and clear, this fact resulting partly from defective construction of the ordinary lenses and partly from other causes.

The present invention contemplates elimination of the objectionable features of the methods and apparatus of the prior art, and consists primarily in making an exposure which produces a photographic record of substantially uniform definition and of definite area upon a sensitized body while the body and the exposure producing means are stationary, advancing the body relatively to its exposure area determining means a distance equal to the length of the record and moving the body and the exposure producing means simultaneously to a position wherein a continuation of the preceding view will upon exposure be projected upon the body through the area determining means, and making another exposure which produces a photographic record of substantially uniform definition upon the body while the body and the exposure producing means are stationary. The present invention further contemplates the provision of simple and efficient apparatus for producing the desired results and especially for effecting advancement of the film the exact distance necessary to cause the adjacent edges of successive records to register.

A clear conception of the various steps of the method and of an embodiment of apparatus for carrying on the method, may be had by referring to the drawing accompanying and forming part of this specification, in which like reference characters designate the same or similar parts in the various views.

Figure 1 is a partly diagrammatic, top sectional view of a camera and its support or mount, the apparatus being adapted for taking panoramic pictures.

Fig. 2 is an end view of the camera and a central vertical section through the support thereof.

Fig. 3 is a diagrammatic top view of a modified form of the apparatus.

While the drawings disclose the invention as being specifically applied in a roll-film camera of the collapsible type employing what is known as an "autographic" back, it is to be understood that the invention is applicable generally to any of the standard or special types of roll-film cameras, regardless of the style of back employed.

The following is a detailed description of the specific form of the apparatus disclosed in Figs. 1 and 2. The camera consists essentially of a casing adapted to house and support a sensitized body such as a roll-film 20, and an exposure producing mechanism mounted in the forward end of the casing. The camera casing comprises a film supporting section 3, a removable back 2 and a bellows 12 adjustably supported upon the bed 15. The exposure producing mechanism or means comprises a lens 13 and a shutter 14, these elements being adjustable along the bed 15 with the end of the bellows 12, to vary the distance from the lens 13 to the film 20.

The opposite ends of the sections 3 of the casing, are provided with means for removably supporting film delivering and receiving spools 19, 18, respectively, the axes of which are parallel and the latter of which is detachably secured to a handle 24. A sheet metal frame 45 is mounted in the section 3 between the spools 19, 18 and is provided with an exposure opening in alinement with the lens 13. The exposure opening of the frame 45 is preferably rectangular in shape and is bounded by parallel end edges 16, 17 and a pair of longitudinal edges 46 disposed at right angles to the end edges. The film guiding rollers 27 are mounted in the section 3 adjacent the ends of the frame 45 and have axes parallel to the axes of the spools 19, 18 and to the edges 16, 17.

The sensitized bodies or films 20 are ordinarily sold rolled upon a spool 19 and are protected from preëxposure by means of a backing strip 21 of paper or other non-transparent material. In loading the camera, a spool 19 containing an unexposed film 20 is mounted in one end of the casing section 3 and the free end of the strip 21 to which the film 20 is attached, is drawn over the rollers 27 past the exposure opening in the frame 45 and is secured to the empty spool 18 mounted in the opposite end of the section 3. The strip 21 together with the film 20 are then advanced by manipulation of the handle 24, in the direction indicated by the arrow in Fig. 1, until the first section of the film 20 is in alinement with the exposure opening and with the lens 13. The film 20 when properly positioned and in readiness for an exposure, engages the rollers 27 and lies in close proximity to the edges 16, 17, 46 of the exposure opening of the frame 45. After the first record has been made, the film 20 may be successively advanced to bring the succeeding unexposed sections thereof in front of the exposure opening, the extent of advancement of the film being approximately indicated by numbers printed on the rear of the strip 21, which are visible through an opening 11 in the camera back 2. The numbers on the rear of the strip 21 are ordinarily spaced apart distances approximately equal to the length of the exposure opening plus an arbitrary distance allowed between successively exposed sections of the film. The distances between successive indicating numerals will vary for different conditions of moisture and temperature of the strip 21.

The camera back 2, which in the drawing is disclosed as being an "autographic" back, is removable from the camera section 3 to permit insertion and removal of the film, by means of locking clips 49. The special back 2 disclosed, is formed with an elongated opening 47 therethrough adjacent and slightly in advance of the edge 17, this opening being bounded by a frame 28 having an edge 26 which is substantially parallel to the edge 17. The opening 47 ordinarily serves to permit notations to be scratched upon the strip 21, and may be closed by means of a cover 34 mounted upon the back 2. The back 2 is also provided with an indicating opening 11, above referred to, which is ordinarily covered by means of transparent material through which the approximate position of the film 20 is apparent. In the present case, the opening 11 is preferably formed somewhat longer than usual in order to aid in producing panoramic records. The back 2 is also provided with a third opening 32 penetrating an adjustable plate 29 slidably mounted in guideways 33 secured to the back 2. The plate 29 has an inwardly directed elongated projection 31 formed with a marking edge which lies in proximity to the backing strip 21, and which edge is parallel to the edge 26 of the frame 28. The plate 29 may be readily adjusted in the guides 33 to make the distance from the marking edge of the projection 31 to the edge 26, exactly equal to the length of the portion of the film 20 exposed, that is a distance slightly greater than the distance between the edges 16, 17.

The camera mount or support disclosed in Figs. 1 and 2, comprises essentially an upper disk 4 having an indicating mark 22, and a lower disk 5 having one or more series of equally spaced graduations 23 thereon. The disks 4, 5 are preferably beveled at their peripheries and are relatively pivotally mounted by means of a cylindrical downwardly extending projection 7 on the upper disk which engages a central socket in the lower disk. The upper disk 4 is provided with an upper plane surface which is perpendicular to the axis of the projection 7. The camera casing is firmly fixed with its lower surface in contact with the upper plane surface of the disk 4, by means of a cap screw 10. The lower disk 5 has a lower plane surface perpendicular to the axis of the projection 7 of the disk 4. The tripod 6 has a top 8 provided with an upper surface adapted for engagement with the lower plane surface of the disk 5, the disk 5 and top 8 being secured to each other by means of a threaded tripod projection 9.

In the modified form of mount or support disclosed diagrammatically in Fig. 3, the upper disk 36 is provided with a transversely slidable plate 38 which is shiftable in a dovetail recess in the top of the disk 36. The disk 36 is pivotally mounted upon the lower disk 37 in a manner similar to that disclosed in Figs. 1 and 2, the disks also being provided with indicating marks 22 and graduations 23. The camera 30 is fixed to the plate 38 by means of a screw 41, and the combined camera 30, plate 38 and disk 36 are rotatable as a unit upon the disk 37 about the pivot 40, the axis of which passes through the lens 39. As the lens 39 is adjustable relative to the film, the plate 38 is also made adjustable so that the axis of the pivot 40 may be maintained in the plane of the lens 39 irrespective of the position of adjustment of the latter. The markings 42 indicate the approximate settings of the plate 38 for corresponding adjustments of the lens 39.

In order to utilize the apparatus hereinabove described to produce panoramic pictures, it is necessary first of all to accurately determine the exposure angle of the camera and to accurately calibrate the lower disk 5. This may readily be done by removing the camera back 2 and placing a piece of ground glass over the exposure opening of the frame 45. The shutter 14 is then opened wide, projecting a view upon the ground glass, the objects of which are reversed in position. The exact location of the objects of the view on the ground glass, is carefully noted. The camera and upper plate 4 are then swung through an angle upon the lower plate 5, in the direction indicated by the arrow in Fig. 1, that is, in a clockwise direction as viewed from the top, until the left hand edge of the view first projected upon the ground glass registers with the right hand edge of the second view. The angle of swing necessary to cause the adjacent end edges of successive views to register, is then laid off upon the periphery of the disk 5, this angle being indicated by two successive graduations 23. After the angle of view has been once accurately determined for a given focal adjustment of the lens 13, the graduations 23 may be equally spaced around the periphery of the disk 5. The angle of view thus determined will be correct only for one adjusted position of the lens 13, say for taking pictures of objects 100 feet or more away from the camera, and the corresponding view angles for lesser distances should be likewise determined if panoramic pictures are to be taken of objects within that range. Necessity of calibrating the disk 5 for focal distances less than 100 feet may be avoided by the use of the apparatus disclosed in Fig. 3, in which case the angle through which the camera is shifted will not change since the lens 39 is always maintained within the plane of the pivot 40.

After the angle of view has been determined, the plate 29 carried by the back 2 must be adjusted so that the distance between the marking edge of the projection 31 and the edge 26 of the frame 28 will be exactly equal to the length of the view on the ground glass. This length is slightly greater than the distance between the end edges 16, 17 of the exposure opening due to the rounding at the edges 16, 17 of the frame.

With the parts thus adjusted, a roll-film 20 is inserted within the camera, the first indicating number being brought to a position at the extreme right hand end of the opening 11 as indicated in Fig. 2. The disks 4, 5 are then disposed in a horizontal position by means of any suitable leveling device, and the indicating mark 22 of the upper disk 4 is brought into alinement with one of the graduations 23 of the lower disk 5 as shown. A hair line is then drawn upon the backing strip 21 with a soft pointed pencil, using the marking edge of the projection 31 as a guide. The first record is then produced upon the film 20, while the camera is stationary.

After making the first record, the film 20 is carefully advanced by means of the handle 24 until the pencil mark made adjacent the projection 31, comes into alinement with the edge 26 of the frame 28. The second indicating number on the rear of the strip 21 will then be in a position slightly to the left of the indicating number 1 disclosed in Fig. 2. The camera and disk 4 are then swung in the direction indicated in Fig. 1 until the mark 22 is in alinement with the next graduation 23, when the apparatus is in readiness for the second record. After the second record has been produced, and a hair line has been drawn on the strip 21 adjacent the marking edge of the projection 31, the film 20 is again carefully advanced by means of the handle 24 until the second pencil mark is in alinement with the edge 26 of the frame 28. The third indicating number on the rear of the strip 21 will then be in about the center of the opening 11, that is slightly farther to the left than the second indicating numeral was. The camera and disk 4 are then again swung in the direction indicated by the arrow in Fig. 1, until the mark 22 is in alinement with the next succeeding graduation 23, when the apparatus is in readiness for the third record. This course of procedure may be followed until the film has been entirely exposed, the succession of individual records thus made producing one continuous negative. If the operations are carefully performed a six-exposure film may be readily exposed to produce a single continuous negative in which the division lines between successive records are scarcely noticeable.

It will also be noted that the disks 4, 5 may be employed to make a succession of records on separate films or plates and that the ends of such individual negatives may then be matched and a continuous print made therefrom. The results derived from this method are not however as good as if all of the records are made upon a single continuous film, the use of such a single film also reducing the necessary labor to a minimum. It is however essential in making successive records upon a continuous film, to move the film 20 and the adjacent portions of the camera, in opposite directions when adjusting the positions of these elements preparatory to making subsequent records. If this is not done, the left hand edge of one record will be continuous with the left hand edge of the next succeeding record and the film must be cut and the ends matched in order to produce a continuous print. It is also essential for perfect results, to carefully mark the strip 21 at the time of making an exposure as the strip 21 will change in length with changes in atmospheric conditions. For this reason the results will not be as good if the strip 21 is provided with printed marks indicating the lengths of successive records, as they will be by marking these distances with the aid of the plate 29. By making the plate 29 adjustable, the lengths of the records may be carefully laid off and a trial exposure will readily indicate which way the plate 29 should be moved in order to produce the best results.

If it is desired to produce panoramic records of objects within 100 feet of the camera, with the apparatus disclosed in Figs. 1 and 2, the lower disk 5 should again be calibrated and a second series of graduations corresponding to a focal distance of say 25 feet, should be laid off upon the periphery of this disk. With the apparatus disclosed in Fig. 3, variations in focal distance are compensated for by adjusting the plate 38 so as to maintain the lens 39 in the plane of the pivot 40. One set of graduations 23 will then suffice for taking panoramic pictures at any distance. The average amateur photographer would not, however, have occasion to take pictures of objects within 100 feet of the camera, so that the second set of graduations and the special arrangement of apparatus disclosed in Fig. 3 would be unnecessary.

In conclusion it will be observed that a simple and efficient method of producing a continuous series of pictures devoid of overlapping or spaced portions, has been provided. The apparatus for carrying on the method is simple, efficient and inexpensive and may be readily manipulated by any person having a fair knowledge of photography and possessing ordinary skill. The attachments are applicable to any of the types of cameras ordinarily used by amateur photographers without making a cumbersome outfit. This feature is of particular advantage to tourists to whom every additional pound of baggage is a factor to be considered.

It will be understood that it is not desired to limit the invention to the exact steps of the process as enumerated or to the exact details of the apparatus shown and described, otherwise than by the scope of the appended claims, for obvious modifications may occur to a person skilled in the art.

It is claimed and desired to secure by Letters Patent:—

1. The method of making a panoramic photographic record with a roll-film utilizing camera, which comprises, making an exposure which produces a photographic record of substantially uniform definition and of definite area upon a film while said film and the camera are stationary, making a mark upon the film backing adjacent the trailing end of said record and advancing the film and its backing relatively to the exposure area determining means until said mark has advanced a distance equal to the length of said record, moving said film and said camera simultaneously to a position wherein a continuation of the preceding view will upon exposure be projected upon said body through said area determining means, and making another exposure which produces a photographic record of substantially uniform definition upon said film while said film and said camera are stationary.

2. In combination, a camera casing, means movably supporting a sensitized body within said casing, means having an opening for defining the area of a photographic record produced by exposure upon said body, means for advancing said body relatively to said opening, gaging means adjacent to said body and observable from the exterior of said casing for indicating when said body has been advanced a distance equal to the length of said opening, and gaging means for indicating when said body has been moved so as to project successive abutting sections of a view through said opening.

3. In combination, a camera casing, means movably supporting a sensitized body within said casing, means having an opening for defining the area of a photographic record produced by exposure upon said body, means for advancing said body relatively to said opening, means providing a pair of edges adjacent to said body and observable from the exterior of said casing, said edges being spaced apart a distance substantially equal to the length of said opening, and gaging means for indicating when said body has been moved so as to project successive abutting sections of a view through said opening.

4. In combination, a camera casing, means movably supporting said camera and a sensitized body within said casing, means having an opening for defining the area of a photographic record produced by exposure upon said body, means for advancing said body relatively to said opening, means providing a pair of edges adjacent to said body and observable from the exterior of said casing, said edges being spaced apart a distance substantially equal to the length of said opening, means for varying the distance between said edges, and gaging means for indicating when said body and said casing have been simultaneously moved so as to project successive abutting sections of a view through said opening.

5. In combination, a camera casing, means pivotally supporting said camera and a sensitized body within said casing, means having an opening for defining the area of a photographic record produced by exposure upon said body, means for advancing said body relatively to said opening, a casing closure adjacent to the rear of said body and having observation openings provided with edges spaced apart a distance substantially equal to the length of said opening, and a graduated dial for indicating when said body and said casing have been moved about said pivot so as to project successive abutting sections of a view through said opening.

In testimony whereof, the signature of the inventor is affixed hereto.

GEORGE STEVENS BLANKENHORN.